(12) United States Patent
Wood et al.

(10) Patent No.: US 9,287,568 B2
(45) Date of Patent: Mar. 15, 2016

(54) HIGH PERFORMANCE, HIGH DURABILITY NON-PRECIOUS METAL FUEL CELL CATALYSTS

(75) Inventors: Thomas E. Wood, Stillwater, MN (US); Radoslav Atanasoski, Edina, MN (US); Alison K. Schmoeckel, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1377 days.

(21) Appl. No.: 12/595,274

(22) PCT Filed: Mar. 17, 2008

(86) PCT No.: PCT/US2008/057179
§ 371 (c)(1),
(2), (4) Date: Jun. 27, 2011

(87) PCT Pub. No.: WO2008/127828
PCT Pub. Date: Oct. 23, 2008

(65) Prior Publication Data
US 2011/0319257 A1    Dec. 29, 2011

Related U.S. Application Data

(60) Provisional application No. 60/911,368, filed on Apr. 12, 2007.

(51) Int. Cl.
| | | |
|---|---|---|
| B01J 31/06 | (2006.01) | |
| B01J 31/16 | (2006.01) | |
| H01M 4/88 | (2006.01) | |
| H01M 4/90 | (2006.01) | |
| H01M 10/0565 | (2010.01) | |

(52) U.S. Cl.
CPC .......... *H01M 4/8882* (2013.01); *H01M 4/8807* (2013.01); *H01M 4/8817* (2013.01); *H01M 4/8842* (2013.01); *H01M 4/9008* (2013.01); *H01M 10/0565* (2013.01); *Y02E 60/50* (2013.01)

(58) Field of Classification Search
CPC ............ H01M 4/8807; H01M 4/8817; H01M 4/8842; H01M 4/8882; H01M 4/9008; Y02E 60/50
USPC ............................ 502/159, 174; 977/788, 902
See application file for complete search history.

(56) References Cited

U.S. PATENT DOCUMENTS

| | | |
|---|---|---|
| 3,985,689 A | 10/1976 | Ferguson |
| 4,128,513 A | 12/1978 | Errede et al. |
| 4,812,352 A | 3/1989 | Debe |
| 4,985,386 A | 1/1991 | Tsurumi et al. |
| 5,039,561 A | 8/1991 | Debe |
| 5,079,107 A | 1/1992 | Jalan |
| 5,176,786 A | 1/1993 | Debe |
| 5,238,729 A | 8/1993 | Debe |
| 5,338,430 A | 8/1994 | Parsonage et al. |
| 5,593,934 A | 1/1997 | Stonehart |
| 5,872,074 A | 2/1999 | Schulz et al. |
| 5,879,827 A | 3/1999 | Debe et al. |
| 5,879,828 A | 3/1999 | Debe et al. |
| 6,040,077 A | 3/2000 | Debe et al. |
| 6,080,641 A | 6/2000 | Nihonmatsu et al. |
| 6,238,534 B1 | 5/2001 | Mao et al. |
| 6,319,293 B1 | 11/2001 | Debe et al. |
| 6,425,993 B1 | 7/2002 | Debe et al. |
| 6,428,584 B1 | 8/2002 | Debe et al. |
| 6,432,571 B1 | 8/2002 | Debe et al. |
| 6,482,763 B2 | 11/2002 | Haugen et al. |
| 6,613,106 B1 | 9/2003 | Debe et al. |
| 6,649,031 B1 | 11/2003 | Iqbal et al. |
| 6,686,308 B2 | 2/2004 | Mao et al. |
| 6,863,838 B2 | 3/2005 | Hamrock |
| 6,939,383 B2 | 9/2005 | Eastin et al. |
| 7,060,738 B2 | 6/2006 | Jing et al. |
| 7,060,756 B2 | 6/2006 | Jing et al. |
| 7,306,824 B1 * | 12/2007 | Coker .......................... 427/228 |
| 2002/0150807 A1 | 10/2002 | Yang |
| 2004/0236157 A1* | 11/2004 | Heilgendorff et al. ........ 568/881 |
| 2005/0069755 A1 | 3/2005 | Vernstrom et al. |
| 2005/0089744 A1 | 4/2005 | Kim et al. |
| 2005/0118480 A1 | 6/2005 | Bauer et al. |
| 2005/0164058 A1 | 7/2005 | Lee et al. |
| 2005/0164061 A1 | 7/2005 | An et al. |
| 2005/0176989 A1* | 8/2005 | Coleman et al. ................ 562/11 |
| 2005/0186465 A1 | 8/2005 | Lee et al. |
| 2005/0255374 A1 | 11/2005 | Kulakov et al. |
| 2006/0014073 A1 | 1/2006 | Kim et al. |

(Continued)

FOREIGN PATENT DOCUMENTS

| | | |
|---|---|---|
| EP | 1854539 A1 | 11/2007 |
| GB | 2440489 A | 1/2006 |
| JP | 2005/066592 | 3/2005 |
| JP | 2008/192502 | 8/2008 |
| WO | WO 03/004156 | 1/2003 |
| WO | WO 2006/083029 | 8/2006 |
| WO | WO 2006/121191 | 11/2006 |

OTHER PUBLICATIONS

US 5,336,558, 08/09/94, Debe (withdrawn).
Bashyam, R. and Zelenay, P.; "A Class of Non-Precious Metal Composite Catalysts for Fuel Cells", Letters, Nature, Sep. 7, 2006, Nature Publishing Group, USA, vol. 443, pp. 63-66.

(Continued)

*Primary Examiner* — Jun Li
(74) *Attorney, Agent, or Firm* — Gregory D. Allen

(57) ABSTRACT

This invention relates to non-precious metal fuel cell cathode catalysts, fuel cells that contain these catalysts, and methods of making the same. The fuel cell cathode catalysts are highly nitrogenated carbon materials that can contain a transition metal. The highly nitrogenated carbon materials can be supported on a nanoparticle substrate.

15 Claims, No Drawings

(56) References Cited

U.S. PATENT DOCUMENTS

| | | | |
|---|---|---|---|
| 2006/0019853 A1* | 1/2006 | Wieprecht et al. | 510/367 |
| 2006/0057452 A1 | 3/2006 | Kim et al. | |
| 2006/0057466 A1 | 3/2006 | Suhara et al. | |
| 2006/0068988 A1* | 3/2006 | Coleman et al. | 502/182 |
| 2006/0183809 A1 | 8/2006 | Liu et al. | |
| 2006/0199068 A1 | 9/2006 | Lee et al. | |
| 2006/0204820 A1 | 9/2006 | Cho et al. | |
| 2007/0082814 A1 | 4/2007 | Debe et al. | |
| 2007/0248752 A1 | 10/2007 | O'Brien et al. | |
| 2007/0248875 A1 | 10/2007 | O'Brien et al. | |
| 2008/0118818 A1* | 5/2008 | Merzougui et al. | 429/44 |
| 2009/0048096 A1* | 2/2009 | Iwata et al. | 502/163 |
| 2009/0226796 A1 | 9/2009 | Atanasoski et al. | |

OTHER PUBLICATIONS

Debe, M. K.; "Novel Catalysts, Catalyst Support and Catalyst Coated Membrane Methods", Handbook of Fuel Cells, Fundamentals, Technology and Applications, vol. 3, Part 3, eds. W. Vielstich, A. Lamm and H. Gasteiger, © John Wiley and Sons, Ltd., Chichester, 2003, pp. 576-589.

Grigoriu, M.A., Villers, D., Jaouen, F., Dodelet, J.P.; "Catalysts for Oxygen Reduction In Pem Fuel Cells Based on Co/Fe Porphyrins", INRS-Énergie, Matériaux et Télécommunications, 13 pages, ProAnca ECS 2005.

Jaouen, F., Charreteur, F. Dodelet, J.P.; "Carbon Structure and Activity of Non-Noble Catalysts for Oxygen Reduction In PEMFC", INRS-Énergie, Matériaux et Télécommunications, 13 pages, ProAnca ECS 2005.

Jaouen, F., Charreteur, F., Dodelet, J.P.; "Fe-Based Catalysts for Oxygen Reduction In PEM Fuel Cells: Importance of The Disordered Phase of The Carbon Support", INRS-Énergier Matériaux at Télécommunications, Revised Dec. 2005, Journal of The Electrochemical Society, 153 (4), pp. A689-A698, 2006.

Jaouen, F., Lefévre, M., Dodelet, J.P.; Cai, M.; "Heat-Treated Fe/N/C Catalysts for $O_2$ Electroreduction: Are Active Sites Hosted In Micropores?", J. Phys. Chem. B., Jan. 24, 2006, American Chemical Society, USA, pp. A-F.

Jaouen, F. Marcotte, S., Dodelet, J. P., Lindbergh, G.; "Oxygen Reduction Catalysts for Eietrolyte Fuel Cells From The Pyrolysis of Iron Acetate Adsorbed on Various Carbon Supports", J. Phys Chem, B, 107, 2003, pp. 1376-1386.

Lefevre, M., Dodelet, J. P.; "$O_2$ Reduction iI PEM Fuel Cells: Activity and Active Site Structural Information for Ctalysts Obtained by The Pyrolysis At High Temperature of Fe Precursors", J. Phys Chem. B. 104, 2000, pp. 11238-11247.

Markovic et al. "Oxygen Reduction Reaction on Pt and Pt taimetalic Surfaces: A Selective Review", Fuel Cells, 2001, vol. 1, No. 2, pp. 105-116.

Matter, P.H., Zhang, L., Ozkan, U.S.; "The Role of Nanostructure In Nitrogen-Containing Carbon Catalysts for The Oxygen Reduction Reaction, Journal of Catalysis", Feb. 10, 2006, pp. 83-96, 239, Elsevier Inc. Available online at www.sciencedirect.com.

Médard, C., Lefévre, M., Dodelet, J.P., Jaouen, F., Lindbergh, G.; "Oxygen Reduction by Fe-Based Catalysts In PEM Fuel Cell Conditions: Activity and Selectivity of The Catalysts Obtained With Two Fe Precursors and Various Carbon Supports", Electrochimica Acta, 51, 2006, Elsevier Inc., pp. 3202-3213, Available online at www.sciencedirect.com, Available online Oct. 13, 2005.

Paulus at al., "Oxygen Reduction on Carbon-Supported Pt-Ni and Pt-Co Alloy Catalysts", J. Phys, Chem., B, 2002, No. 106, pp. 4181-4191.

Subramanian, N.P., Kumaraguru, S.P., Colon-Mercado, H., Kim, H., Popov, B.N., Black, T., Chen, D.A., Studies on Co-based catalysts supported on modified carbon substrates for PEMFC cathodes, Journal of Power Sources, Jul. 10, 2005, 7216, Elsevier Inc., pp. 1-8. Available online at www.sciencedirect.com.

International Search Report; PCT/US2008/057179, International filing Date Mar. 17, 2008, 4 pages.

* cited by examiner

HIGH PERFORMANCE, HIGH DURABILITY NON-PRECIOUS METAL FUEL CELL CATALYSTS

RELATED APPLICATIONS

CROSS REFERENCE TO RELATED APPLICATIONS

This application is a national stage filing under 35 U.S.C. 371 of PCT/US2008/057179, filed Mar. 17, 2008, which claims priority to U.S. Provisional Application No. 60/911368, filed Apr. 12, 2007, the disclosure of which is incorporated by reference in its/their entirety herein.

This invention was made with Government support under Cooperative Agreement DE-FC36-03G013106 awarded by the Department of Energy. The Government has certain rights in this invention.

FIELD OF THE INVENTION

This invention relates to non-precious metal catalysts that can be used in membrane electrode assemblies for fuel cells and other electrochemical devices, and their function as fuel cell cathode catalysts.

BACKGROUND OF THE INVENTION

Fuel cells are electrochemical energy conversion devices that produce electricity catalytically from external supplies of a fuel such as hydrogen and an oxidant such as oxygen in the presence of an electrolyte. Because fuel cells do not combine fuel and oxidant directly through combustion, they produce energy at higher efficiencies and with less hazardous effluent as compared to internal combustion generators. Generally, fuel cells can operate continuously as long as the flow of fuel and oxidant is maintained. This feature, combined with their lack of moving parts, underscores their utility as reliable power sources in remote locations such as spacecraft, isolated weather stations, inaccessible rural locations, and the like.

A proton exchange membrane (PEM) fuel cell, sometimes called a polymer electrolyte membrane fuel cell, normally contains a membrane electrode assembly (MEA), formed by an electrolyte membrane disposed between a pair of catalyst layers, which are correspondingly disposed between a pair of gas diffusion layers (GDL). In a typical PEM fuel cell, hydrogen is oxidized at the anode side of the MEA to form protons and electrons, while oxygen is reduced at the cathode side of the MEA by its reaction with protons and electrons to form water and heat. The electrolyte membrane transports the protons from anode to cathode while the current of electrons flows through an external circuit from anode to cathode to provide power.

Commercial and large scale fuel cell applications still face certain impediments, many of which center around the performance of the catalysts and catalyst layers. For example, to attain desirable operating voltages, large amounts of precious metals such as platinum often are required for the catalyst layers, a feature that increases material costs. Further, at high voltages many useful metal catalysts can react with water, oxygen, and/or other contaminants to degrade catalytic activity and limit the useful life of the fuel cell. As such, there is a continuing need for alternative catalyst materials that can improve fuel cell performance, lower material costs, or enhance catalyst durability.

SUMMARY OF THE INVENTION

Platinum, platinum alloys, and platinum supported on carbon have long been among the catalysts of choice for fuel cell applications because platinum possesses a unique combination of an electronic structure well-suited for oxidation-reduction (redox) catalysis, along with excellent acid stability. However, availability and cost issues for platinum, as well as its own oxidation at desirable higher voltages (e.g., above about 0.65 volts) have bolstered the interest in minimizing or even eliminating platinum as a fuel cell catalyst. In one aspect, minimizing or eliminating platinum catalysts can be effected by employing non-precious metal fuel cell catalysts.

This disclosure relates to non-precious metal fuel cell catalysts and components, fuel cells comprising these catalysts and components, and methods of making the same. In particular, this disclosure provides for fuel cell cathode catalysts for oxygen reduction, including non-precious metal cathode catalysts that are supported on a nanoparticle substrate. In one aspect, this invention provides for a method of making a fuel cell cathode catalyst comprising the steps of:

a) pyrolyzing a mixture comprising at least one nitro-containing, amino-containing aromatic compound and at least one transition metal salt under a substantially inert atmosphere to form a metal-containing polymer;

b) activating the metal-containing polymer by heating in the presence of a nitrogenous activating agent to form a metal-containing fuel cell cathode catalyst; and c) optionally, washing the metal-containing fuel cell cathode catalyst with a metal removing agent to form a washed fuel cell cathode catalyst.

When the nitro-containing, amino-containing aromatic compound and the transition metal salt are pyrolyzed in the presence of a nanoparticle substrate, a supported fuel cell cathode catalyst can be formed. Thus, another aspect of this invention provides a method of making a supported fuel cell cathode catalyst comprising:

a) pyrolyzing, under a substantially inert atmosphere, a mixture comprising:
   i) at least one nitro-containing, amino-containing aromatic compound;
   ii) at least one transition metal salt; and
   iii) at least one nanoparticle substrate;
to form a supported metal-containing polymer;

b) activating the supported metal-containing polymer by heating in the presence of a nitrogenous activating agent to form a metal-containing supported fuel cell cathode catalyst; and c) optionally, washing the metal-containing supported fuel cell cathode catalyst with a metal removing agent to form a washed supported fuel cell cathode catalyst.

DETAILED DESCRIPTION OF THE INVENTION

As provided herein, this invention relates to non-precious metal fuel cell catalysts and components and methods of making and using the same. In particular, this disclosure provides for non-precious metal fuel cell cathode catalyst materials, as well as non-precious metal fuel cell cathode catalysts supported on a nanoparticle substrate. For example, specific aspects of non-precious metal fuel cell catalysts disclosed herein include, but are not limited to, the following: 1) the polymerization of nitroanilines or related aromatic molecules in the presence of a metal salt such as iron chloride or cobalt chloride, followed by thermal activation of the polymer to produce an extremely active fuel cell catalyst; and 2) the preparation and use of conducting nanoparticle materials such as TiC, $TiSi_{1.95}$, or TiN that support a non-precious metal fuel cell catalysts to form extraordinarily durable, highly activity, supported non-precious metal fuel cell catalysts.

One aspect of this invention provides a method of making a fuel cell cathode catalyst comprising the steps of:

a) pyrolyzing a mixture comprising at least one nitro-containing, amino-containing aromatic compound and at least one transition metal salt under a substantially inert atmosphere to form a metal-containing polymer; and b) activating the metal-containing polymer in the presence of a nitrogenous activating agent to form a metal-containing fuel cell cathode catalyst.

Thus, step a) essentially involves polymerizing at least one nitro-containing, amino-containing aromatic compound by heating in the presence of at least one transition metal salt, under a substantially inert atmosphere, to form a metal-containing polymer. Step b) essentially involves further treating the metal-containing polymer to form a an activated metal-containing polymer, which is also referred to as the metal-containing fuel cell catalyst.

As used herein, the term "metal-containing" such as in the terms "metal-containing polymer" and "metal-containing fuel cell catalyst" refers to a material that contains a transition metal. The metal-containing polymer or metal-containing fuel cell catalyst can optionally include non-transition metals also. For example, the metal-containing polymer or metal-containing fuel cell catalyst can optionally include precious metals.

Following the activation step, the metal-containing fuel cell cathode catalyst can be washed with a metal removing agent such as an aqueous acid or any other suitable metal removing agent to form a washed fuel cell cathode catalyst. In some embodiments, the washed fuel cell cathode catalyst is substantially free of transition metal. The term "substantially free" of transition metal is intended to reflect that the fuel cell cathode catalyst will contain only trace amounts of transition metal following the washing step with the metal removing agent. However, in other embodiments, any desired amount of transition metal can be removed from the metal-containing fuel cell cathode catalyst on the basis of the duration or extent of the washing step, the pH of the solution when an aqueous acid is used in the wash step, and similar variables, to obtain a washed fuel cell cathode catalyst that contains less transition metal than the metal-containing fuel cell cathode catalyst that has not been subjected to a washing step.

Still another aspect of the catalysts and methods of this invention is the use of precious metals as an optional component of the catalysts disclosed herein. In this aspect, at least one precious metal optionally can be used or incorporated in any known manner by which precious metals are employed as components in a fuel cell catalyst system. For example, at least one precious metal can be deposited onto the nanoparticle-supported non-precious metal catalysts prepared as disclosed herein. Alternatively, at least one precious metal also can be present in the mixture to be pyrolyzed such that the precious metal(s) is incorporated into the metal-containing polymer material or the activated metal-containing polymer as it is formed. In this aspect, optional precious metals can be incorporated without limitation, in any manner disclosed or known.

In general terms, the pyrolysis/polymerization step can be continued for any length of time, including for a period of time until the evolution of volatile by-products has substantially ceased or has completely ceased. The term "substantially" ceased is meant to include such a time when only trace amounts of volatile by-products are still being generated at the pyrolysis temperature. Typically, the nitro-containing, amino-containing aromatic compound(s) and transition metal salt(s) can be intimately or thoroughly mixed prior to pyrolyzing. While an intimately combined composition or mixture typically is considered advantageous, it is not required. For example, as the polymerization temperature is approached, most of the nitro-containing, amino-containing aromatic compound(s) that can be used in this invention will form a melt that contains the transition metal salt(s). In a further aspect, the pyrolysis/polymerization step also can be carried out in the substantial absence of a protic acid, if so desired.

In a further aspect of this invention, it can be very advantageous to intimately mix the reagents, including the nitro-containing, amino-containing aromatic compound(s), the transition metal salt(s), along with any other components, prior to the heating and polymerization step. In this aspect, it appears to be particularly helpful to intimately mix the reagents when a particular reagent in the mixture is not soluble in the molten mixture as the temperature is increased, or when the aromatic compound(s) and/or auxiliary compounds do not completely melt prior to the initiation of polymerization. For example, intimate mixing is helpful when the polymerization is conducted in the presence of a nanoparticle substrate, or when an auxiliary compound or a metal complex is included that is not soluble in the molten intermediate mixture. The intimate mixing can be accomplished by any number of ways, including, but not limited to, milling or attriting the reagent mixtures. In this mixing step, the combination of all the reagents can be milled together, or subcombinations such as pairs of the reagents can be milled together, prior to mixing and before heating to induce or finish the polymerization. In another aspect of this invention, energetic mixing such as by milling can be used to initiate the polymerization of the reagents. Typically, in this aspect, following the energetic mixing, the polymerization can be finished by the thermal treatment. In a further aspect, the pyrolysis/polymerization step also can be carried out in the substantial absence of a protic acid, if so desired.

The mixture comprising at least one nitro-containing, amino-containing aromatic compound and at least one transition metal salt is pyrolyzed under a substantially inert atmosphere to form a metal-containing polymer. The term "substantially inert" atmosphere is meant to include any atmosphere that has been rendered more inert than air. In this aspect, useful atmospheres for these reactions may be referred to as simply an atmosphere that has been "inerted." For example, with the understanding that dry air contains about 21% oxygen and about 78% nitrogen, in one aspect, the substantially inert atmosphere of this invention can contain less than about 75% air, less than about 50% air, less than about 25% air, less than about 20% air, less than about 15% air, less than about 10% air, less than about 5% air, or less than about 2% air. The balance of the substantially inert atmosphere is usually an added inert gas such as nitrogen or argon. It is not necessary to conduct these pyrolysis reactions under a pure nitrogen or argon atmosphere, or using specialized Schlenk or vacuum line equipment. The polymerization can be conducted using simple equipment, for example, by fitting a beaker containing the reagents to be pyrolyzed with a loose-fitting aluminum foil cover having a hole in the center to allow an introduction of nitrogen gas. Typically, the beaker is flushed with a flow of nitrogen gas and heated on a hot plate while maintaining a gentle flow of nitrogen.

Generally, the pyrolysis/polymerization step can occur by heating the mixture of nitro-containing, amino-containing aromatic compound(s) and transition metal salt(s) under a substantially inert atmosphere to a temperature of at least about 150° C. For example, this pyrolysis step also can be carried out a temperature of at least about 200° C., at least about 300° C., at least about 400° C., at least about 500° C., at least about 600° C., or at least about 700° C. In this aspect, for example, the pyrolysis/polymerization step can occur by heating the nitro-amino-aromatic compound(s) and transition metal salt(s) at a temperature from about 150° C. to about 700° C., from about 175° C. to about 500° C., from about 200° C. to about 400° C., from about 225° C. to about 375° C., or from about 275° C. to about 350° C. Once the polymerization reaction has apparently ceased, continued heating at even higher temperatures can be used, for example, to ensure complete reaction or to help eliminate impurities that might be volatile at that temperature. In this aspect, for example, pyrolysis under a substantially inert atmosphere may be accomplished in more than one heating step, for example, heating the mixture of nitro-containing, amino-containing aromatic compound(s) and transition metal salt(s) under a substantially inert atmosphere to a first temperature of around 350° C. to around 450° C. for a first period of time, followed by heating the resulting pyrolysis product under a substantially inert atmosphere to a second temperature of around 550° C. to around 650° C. for a second period of time.

The activation step typically is carried out by heating to relatively high temperatures, for example, at least about 300° C. or at least about 400° C., while contacting the metal-containing polymer with a nitrogenous activating agent. In one aspect, the nitrogenous activating agent comprises at least one volatile nitrogenous compound, including compounds that are gases or that are volatile at room temperature, and compounds that can be volatilized under the activation conditions. The nitrogenous activating agent can optionally further comprise an inert diluent such as argon if desired. Examples of suitable nitrogenous compounds include, but are not limited to, ammonia, nitrogen, acetonitrile, pyridine, hydrogen cyanide, cyanogen, pyrrole, pyrrolidine, quinoline, tetrahydroquinoline, piperidine, or any combination thereof. Examples of combinations of nitrogenous compounds that constitute the nitrogenous activating agent include mixtures such as $NH_3/N_2$, $NH_3$/acetonitrile, $N_2$/HCN, and the like. While not bound by theory, it appears that ammonia provides the benefit of etching the carbon to some extent, thereby opening pores and providing higher surface areas. Although nitrogen alone can serve as a nitrogenous activating agent, the activity of the resulting catalyst is typically not as high as when ammonia or an ammonia/nitrogen mixture is employed. Again, while not bound by theory, it is believed that one aspect of the activation step is the removal of chloride from the metal-containing polymer in the form of nitrogen- and chloride-containing compounds such as ammonium chloride, which sublimes from the sample being activated at elevated temperatures. In one aspect, the activating step can be carried out under anhydrous conditions.

In general terms, the activation step can occur by heating the metal-containing polymer in the presence of a nitrogenous activating agent to a temperature of at least about 300° C. For example, this activation step can be carried out at a temperature of at least about 350° C., at least about 400° C., at least about 500° C., at least about 600° C., at least about 700° C., at least about 800° C., at least about 900° C., at least about 950° C., or at least about 1000° C. In another aspect, this activation step can be carried out by heating the metal-containing polymer in the presence of a nitrogenous activating agent at a temperature from about 600° C. to about 1000° C., from about 700° C. to about 1000° C., from about 800° C. to about 1000° C., from about 800° C. to about 950° C., or from about 850° C. to about 950° C.

Depending upon the identity of the particular nitro-containing, amino-containing aromatic compound as well as the particular transition metal salt, the polymerization reaction itself appears to initiate at a temperature ranging from about 150° C. to about 500° C., or even at temperatures outside this range as determined by the particular combination of nitro-containing, amino-containing aromatic compound and transition metal compound. For example, when the nitro-containing, amino-containing aromatic compound is 4-nitroaniline and anhydrous Fe(II) chloride or Co(II) chloride are used as the transition metal salts, heating the mixture to a temperature between about 275° C. and about 300° C. first melted the 4-nitroaniline, the liquefied mixture began to smoke, and the mixture then expanded and solidified with the sharp release of gas. Continued heating under a nitrogen atmosphere at around 400° C. was typically applied, followed by heating from about 400 to about 600° C., and then followed by an activation step under $N_2/NH_3$ from about 900° C. to about 950° C.°.

In a further aspect, many different non-precious transition metal salts can be used in the pyrolysis/polymerization steps, including, but not limited to, salts of Fe(II), Fe(III), Co(II), Cr(II), Cr(III), Mn(II), Ni(II), Cu(II), or any combination thereof. Thus, the term "non-precious" transition metal does not include ruthenium, osmium, rhodium, iridium, palladium, platinum, gold, or silver. The non-precious transition metal salts used are typically anhydrous salts, although this is not a requirement. Either anhydrous metal salts or hydrous metal salts (hydrates) of non-precious metals can be used, as hydrous salts typically are thermally dehydrated as the temperature increases and the pyrolysis/polymerization step initiates. The term "salt" is intended to be non-limiting and to encompass any metal compound of the relevant oxidation state, regardless of whether the metal compound exists as a salt form in the solid state or in solution. Rather, this term is intended to encompass coordination compounds that may or may not exist as salts. Examples of suitable salts include, but are not limited to, metal chlorides, metal bromides, metal iodides, metal fluorides, metal acetates, metal nitrates, metal nitrites, metal carbonates, metal cyanides, metal hydroxides, metal phosphates, metal phosphites, metal sulfites, metal sulfates, or any combination thereof.

While not bound by theory, it is thought that the non-precious metal salts behave as Lewis acids in that they are capable of coordinating the nitro-containing, amino-containing aromatic compounds in some fashion, although the manner by which this occurs is not known, and assist in increasing the nitrogen content of the polymers and catalysts disclosed herein. It is also possible that the metals perform as a type of template that can assist in forming nitrogen-rich domains between and among the condensing aromatic molecules as pyrolysis/polymerization proceeds. Such templates can assist in defining a porous three-dimensional structure on the molecular scale, which can become even more porous upon activation and removal of the metal salt. Thus, the metal-containing polymer, the "activated" metal-containing polymer referred to as the metal-containing fuel cell cathode catalyst, and the washed metal-containing fuel cell cathode catalyst, all can be described as "highly-nitrogenated carbon," or HNC. Again, while not intending to be bound by theory, it is thought that the incorporation of nitrogenous compounds in the mixture to be pyrolyzed, and the retention of nitrogen as the mixture is heated and polymerization ensues, may assist in defining the nitrogen-rich, porous three-dimensional structure on the molecular scale.

Any number of nitro-containing, amino-containing aromatic compounds can be used in this invention, including combinations of more than one such compound, and compounds with a wide range of other substituents. Any compound containing an aromatic core that also contains at least one nitro group and at least one amino group bonded thereto can be employed in this invention, including compounds containing core structures selected from benzene, naphthalene, fluorene, anthracene, pyridine, quinoline, and the like.

In a further aspect, the nitro-containing, amino-containing aromatic compounds generally can be further substituted with a wide range of substituents other than nitro and amino. Suitable substituents include, but are not limited to, alkyl groups, alkoxy groups, aryloxy groups, halo groups, or combinations thereof. Aromatic compounds containing additional substituents of any size, weight, or electronic properties can be used. Moreover, any regioisomer of the substituted aromatic compound can be employed, although in one aspect, compounds with para-nitro and -amino substituents appear to work very well. The aromatic compound can contain 1, 2, 3, or even more aromatic rings, and these rings can be fused or simply linked. In another aspect, carbocyclic as well as heterocyclic aromatic compounds work well. For example, aromatic compounds containing benzene, pyridine, and other aromatic moieties can be used.

Suitable nitro-containing, amino-containing aromatic compounds can be selected from 2-nitroaniline, 3-nitroaniline, 4-nitroaniline, 2-methyl-3-nitroaniline, 2-methyl-4-nitroaniline, 2-methyl-5-nitroaniline, 2-methyl-6-nitroaniline, 4-methyl-2-nitroaniline, 4-ethyl-2-nitroaniline, 2-chloro-4-nitroaniline, 2-methyl-4-nitroaniline, 2-amino-4-nitrophenol, 3-methyl-4-nitrophenol, 2-amino-4-nitrotoluene, 2-amino-4-chloro-5-nitrotoluene, 2,6-dichloro-4-nitroaniline, 2,6-dibromo-4-nitroaniline, 4,5-dichloro-2-nitroaniline, 4-(benzyloxy)-5-bromo-2-nitroaniline, 4-(tert-butyl)-3-nitroaniline, 4-benzyloxy-2-nitroaniline, 4-methoxy-3-nitroaniline, 5-bromo-4-methyl-2-nitroaniline, 5-chloro-2-methoxy-4-nitroaniline, 5-ethoxy-4-fluoro-2-nitroaniline, 5-nitro-1-naphthylamine, 2-amino-7-nitrofluorene, 4-nitrophthalimide, 2-amino-5-nitropyridine, or any combination thereof.

Still a further aspect of this invention relates to the use of at least one optional auxiliary nitrogen-containing compound as an additive in the mixture to be pyrolyzed, along with the nitro-containing, amino-containing aromatic compound(s) and the transition metal salt(s). Suitable auxiliary nitrogen-containing compounds that can be used include various porphyrins, nitrophenylazo compounds, phenanthrolines, piperazines, pyrroles, imidazoles, and the like, as well as metal complexes of these compounds. Moreover, combinations of auxiliary nitrogen-containing compounds and/or metal complexes of such compounds are useful. In this aspect, the mixture containing the auxiliary nitrogen-containing compound(s) can be heated and activated in the same manner described herein, to form a metal-containing fuel cell cathode catalyst with tailored properties resulting from the use of the optional additives. The optional washing step to remove metals can also be employed to provide a washed fuel cell cathode catalyst with customized properties resulting from the use of the optional additives. In some embodiments, the washed fuel cell cathode catalyst can be substantially free of transition metal.

Examples of the auxiliary nitrogen-containing compound include, but are not limited to, haematoporphyrin dihydrogen chloride, porphyrin, protoporphyrin, 5,10,15,20-tetra(4-pyridyl)porphyrin, 5,10,15,20-tetrakis(1-methyl-4-pyridinio) porphyrin tetra(p-toluenesulfonate), 5,10,15,20-tetrakis(4-trimethylammoniophenyl)porphyrin tetra(p-toluenesulfonate), meso-tetra(N-methyl-4-pyridyl) porphyrin iron, 4-(4-nitrophenylazo)catechol, 4-(4-nitrophenylazo)-1-naphthol, 4-(4-nitrophenylazo)resorcinol, 5-nitro-1,10-phenanthroline, diaminomaleonitrile and its derivatives, 1-(4-nitrophenyl)-1H-imidazole, 1-(4-nitrophenyl)-1H-pyrrole, 1-(4-nitrophenyl)-3-pyrrolidino-2-pyrazolin-5-one, 1-(4-nitrophenyl)glycerol, 1-(4-nitrophenyl)piperazine, any transition metal complex thereof, or any combination of these compounds, including combinations that include transition metal complexes thereof. For example, complexes of these nitrogenous compounds can include complexes of Fe(II), Fe(III), Co(II), Cr(II), Cr(III), Mn(II), Ni(II), Cu(II), and the like. Again, while not intending to be bound by theory, it is thought that the incorporation of additional nitrogenous compounds in the mixture to be pyrolyzed, and/or metal complexes of these, may assist in incorporation and retention of nitrogen as the mixture is heated and polymerization ensues, which in turn may assist in defining the nitrogen-rich, porous three-dimensional structure on the molecular scale of the highly-nitrogenated carbon (HNC) that is graphite-like. Therefore, it is believed that such compounds have the capability of bonding or being incorporated in the three-dimensional structure as it is formed.

Exclusive of any metal-containing species that may be present, the HNC materials of the present invention are composed mainly of carbon and nitrogen with the majority of the nitrogens being present as amine nitrogens. Despite this, these materials exhibit only very weakly basic properties. This is because the majority of the nitrogens in the aromatic structure of these catalyst materials are in close proximity to at least one other nitrogen. For example, often more than one nitrogen is in the same aromatic ring. Thus, while the prior art for non-precious metal fuel cell catalysts comprising carbon and nitrogen teaches the necessity of having nitrogen in a pyridine-like configurations, that is, having a maximum of only one nitrogen per aromatic ring, the present catalyst materials can comprise aromatic structures wherein more than one nitrogen can be present in the aromatic rings. The presence of these multiple nitrogen containing aromatic rings tends to suppress the basicity of the highly nitrogenated carbon catalyst. The multiple nitrogen containing aromatic rings characteristics can be modeled using compounds such as pyrazine, pyridazine and pyrimidine. Pyrazine has a pKa of 0.37, pyrimidine has a pKa of 1.1, and pyridazine has a pKa of 2.1. This is in sharp contrast with the more basic pyridinic aromatic molecules. For example pyridine has a pKa of about 5.2, quinoline has a pKa of about 5.14, phenanthroline has a pKa of about 5, benzoquinoline has a pKa of about 5.0, and isoquinoline has a pKa of about 5.14. Carbonaceous conjugated materials comprising these pyridinic moieties would be expected to exhibit similar high pKa's.

The HNC materials of the present invention may comprise aromatic carbonaceous, graphite-structured materials containing poly-nitrogen aromatic rings. The result is that the materials of the present invention, although highly nitrogenated, are much less basic than compounds comprising only pyridinic nitrogens. While not wishing to be bound by theory, it is believed that a requisite for strong catalytic function in the highly nitrogenated carbon catalysts is that they be sufficiently weak bases so as to not bind protons strongly in the acidic environment of an acid fuel cell. The result of generating HNC materials with very weakly basic nitrogens is to create active sites comprising nitrogens that are more oxo-philic and less proto-philic. It is believed that the active sites for the adsorption and activation of oxygen in the fuel cell reaction comprise these oxo-philic, low-basicity nitrogens.

The basicity of the nitrogen sites in the catalysts of the present invention can be measured by measuring the acidity of the hydrogen sulfate salts of these materials. This acidity can be used to characterize the materials of the present invention and is measured using the following procedure: 3.0 g of the dried, acid washed and deionized water-washed catalyst (prepared as described in the examples) is suspended in 10.0 g of deionized water (deionized water having a pH greater than 5.4 and less than 6.0). The pH of the dispersion is measured by using a standard, calibrated pH electrode. The pH value resulting from this test is herein designated the "HNC acidity value." This test as applied to the materials of the present invention demonstrates the weakly basic nature of these highly nitrogenated carbon catalysts. For the materials of the present invention, the HNC acidity value is often less than 3.0, less than 2.75, or less than 2.5.

Another aspect of this disclosure relates to the weight ratios of the components in the mixture that is to be pyrolyzed. When weight ratios or any ratios of components are recited, the ratio is based on the total amount of the recited component, regardless of whether a single compound or more than one compound constitutes that component. Generally, the weight ratio of the at least one transition metal salt to the at least one nitro-containing, amino-containing aromatic compound in the mixture to be pyrolyzed can be from about 10:1 to about 1:10, from about 5:1 to about 1:5, from about 2:1 to about 1:5, or from about 2:1 to about 1:2. The weight ratio of the at least one transition metal salt to the at least one optional auxiliary nitrogen-containing compound in the mixture to be pyrolyzed can be from about 10:1 to about 1:10, from about 10:1 to about 1:5, from about 10:1 to about 1:2, from about 5:1 to about 1:5, or from about 2:1 to about 1:2.

As disclosed, the metal-containing fuel cell cathode catalyst can be washed with a metal removing agent to form the washed fuel cell cathode catalyst. In some embodiments, the washed fuel cell cathode catalyst is substantially free of transition metal, or has a reduced transition metal content. In one aspect, aqueous acids are convenient metal removing agents. However, any suitable metal removing agent that can bond to, complex to, or otherwise remove a metal cation can be used in this step, including, but not limited to: aqueous acids, ammonium or alkaline metal carboxylates, a basic solution of a polyol, and the like. For example, ammonium or alkaline metal carboxylates include, but are not limited to, compounds such as ammonium, sodium, or potassium salts of tartrate, oxalate, citrate, formate, acetate, proprionate, aldarate, malonate, malate, succinate, glutarate, citrate, and the like, including any combination thereof. Examples of basic solutions of a polyols include, but are not limited to, a base-sugar mix, a base-glycol mix, or a base-triethanol amine mix, and the like. When the metal removing agent is an aqueous acid, any aqueous Brønsted (protic) acid can be employed in the washing step, including strong acids or weak acids. Further, inorganic (mineral) acids or organic acids can be employed. Examples of suitable acids include, but are not limited to, HCl, HBr, HI, $H_2SO_4$, $H_2SO_3$, $HNO_3$, $HClO_4$, $[HSO_4]^-$, $[HSO_3]^-$, $[H_3O]^+$, $H_2[C_2O_4]$, $HCO_2H$, $HClO_3$, $HBrO_3$, $HBrO_4$, $HIO_3$, $HIO_4$, $FSO_3H$, $CF_3SO_3H$, $CF_3CO_2H$, $CH_3CO_2H$, $B(OH)_3$, and the like, including any combinations thereof.

The catalysts of the present invention after acid washing often comprise mainly carbon and nitrogen. In those embodiments where a nanoparticle substrate is not used, the catalysts usually comprise greater than 2 weight percent, greater than 4 weight percent, greater than 6 weight percent, or greater than 8 weight percent nitrogen. In those embodiments involving the use of a nanoparticle substrate, the nitrogen content of the catalysts can vary depending on the content of the nanoparticle substrate. In these cases, it is desired that the catalysts comprise greater than 1 weight percent nitrogen, greater than 2.5 weight percent, greater than 4 weight percent, or even 5 weight percent nitrogen.

While the activity of these non-precious metal cathode catalysts is high, the durability as measured by the decay of activity over time can be adversely affected when carbon is used as a conductive, acid-stable substrate. Carbon supports are known to suffer from oxidative instability that typically limits their durability in a fuel cell environment. For example, this instability contributes to the decrease in activity over time for platinum on carbon fuel cell catalysts. Nanoparticle substrates other than carbon can be used as platforms for the non-precious metal cathode catalysts of this invention. In this aspect, for example, this invention also provides a method of making a supported fuel cell cathode catalyst comprising:

a) pyrolyzing, under a substantially inert atmosphere, a mixture comprising:
  i) at least one nitro-containing, amino-containing aromatic compound;
  ii) at least one transition metal salt; and
  iii) at least one nanoparticle substrate;
to form a supported metal-containing polymer; and
b) activating the supported metal-containing polymer in the presence of a nitrogenous activating agent to form a metal-containing supported fuel cell cathode catalyst.

Following the activation step, the metal-containing supported fuel cell cathode catalyst can be contacted or washed with a metal removing agent such as an aqueous acid to form a washed supported fuel cell cathode catalyst. In some embodiments, the washed supported fuel cell cathode catalyst is substantially free of transition metal. However, in other embodiments, any amount of transition metal can be removed from the supported metal-containing polymer on the basis of the duration or extent of the washing step, the pH of the aqueous acid used in the wash step, and similar variables, to obtain a supported metal-containing cathode catalyst that contains various amounts of transition metals, and which have less metal content that the metal-containing fuel cell cathode catalyst that has not been subjected to a washing step.

When the polymerization is conducted in the presence of a nanoparticle substrate, the nanoparticle substrate can serve as a support for the polymer. The term nanoparticle substrate simply refers to the use of a nanoscopic material as defined herein as the substrate onto which the polymer can be supported, and which generally comprises a conducting material. The term nanoparticle substrate generally refers to an electrically conducting nanoscopic materials such as carbon, TiC, $TiSi_{1.95}$, or TiN. These materials can be used to fabricate nanostructured elements. For example, nanoparticle carbides such as nanoparticle TiC, WC, SiC or any combination thereof can be employed as conductive and stable supports for the fuel cell catalysts disclosed herein. The deposition of the non-precious metal catalysts onto any of these tailored supports can be carried out as disclosed herein. Although the size of a nanoscopic support particle increased as the non-precious metal highly nitrogenated carbon catalyst is supported thereon, these materials are referred to as nanoscopic catalysts. Thus, the nanoscopic catalysts of this invention comprise a nanoscopic support particle and a supported polymer catalyst, either transition metal-containing polymer catalyst or a substantially metal-free polymer catalyst.

In a further aspect of this invention, when the pyrolysis step is conducted in the presence of a nanoparticle substrate, the weight ratio of the at least one transition metal salt to the at least one nanoparticle substrate can be from about 10:1 to about 1:10, from about 5:1 to about 1:5, from about 3:1 to about 1:3, or from about 3:1 to about 1:1. In these mixtures that contain at least one nanoparticle substrate, the weight ratio of the at least one transition metal salt to the at least one nitro-containing, amino-containing aromatic compound can be from about 10:1 to about 1:10, from about 5:1 to about 1:5, from about 2:1 to about 1:5, or from about 2:1 to about 1:2. Also in these mixtures that contain at least one nanoparticle substrate, the weight ratio of the at least one transition metal salt to the at least one optional auxiliary nitrogen-containing compound in the mixture to be pyrolyzed can be from about 10:1 to about 1:10, from about 10:1 to about 1:5, from about 10:1 to about 1:2, from about 5:1 to about 1:5, or from about 2:1 to about 1:2. As before, when weight ratios or any ratios of components are recited, the ratio is based on the total amount of the recited component, regardless of whether a single compound or more than one compound constitutes that component.

In general, suitable parameters for conducting the pyrolysis step, the activation step, and the optional washing step are substantially the same as those disclosed when these steps are conducted in the absence of any nanoparticle support material.

A wide range of nanoparticle substrate supports can be employed in this aspect of the present invention. For example, typically the nanoparticle substrate can comprises a carbide, a silicide, or a nitride of Ti, Ta, or W, or any combination thereof. However, the substrate support material is not limited to these carbides, silicides, or nitrides. For example, the at least one nanoparticle substrate can comprise or can be selected from a binary or a ternary carbide, nitride, or silicide of Ti, Zr, Hf, V, Nb, Ta, Cr, Mo, W, Mn, Re, Fe, Ru, Co, Ni, Cu, B, or Si, or any combination thereof, that is substantially in nanoparticle form. By describing the suitable materials as a binary or ternary carbide, nitride, or silicide, the intention is to include, for example, binary carbides, binary nitrides, and binary silicides of any of these metals, or any combinations of these materials. Further, the term ternary is meant to include ternary materials in which two different metals are combined with any one of carbon, nitrogen, or silicon, and is meant to include ternary materials in which a single metal is combined with any two of carbon, nitrogen, or silicon. Thus, ternary materials can be selected from dimetal carbides, dimetal nitrides, dimetal silicides, metal carbonitrides, metal carbosilicides, metal nitrosilicides, or any combination thereof. The TiSi-type nanoparticles on the GDL can provide very electrically stable layers for fuel cell applications.

Using the simple abbreviation "HNC" to represent the highly nitrogenated carbon material that is either the metal-containing or metal-free prepared according to the present invention, suitable examples of catalysts include nanoparticle-supported materials such as HNC-TiC, HNC-TiN, HNC-TiSi$_{1.95}$, HNC-Ti$_{30}$Si$_{70}$, HNC-WC, HNC-SiC, and HNC-C, as well as the polymer catalysts that are not supported on a nanoparticle, represented simply as HNC.

Once prepared, a dispersion of the catalyst particles of the present invention can be deposited onto a backing layer or gas diffusion layer (GDL) using any method known in the art. For example, dispersion coating methods such as dip coating, spray coating, spin coating, blade or knife coating, bar coating, roll coating, and pour coating (that is, pouring a liquid onto a surface and allowing the liquid to flow over the surface), or any combination of these methods, can be used. Alternatively, simply brushing a coating of the dispersion on the backing layer or GDL can be used. In one aspect, a dispersion of the catalyst particles of the present invention can be prepared as an ink dispersion. For example, the catalyst particles can be mixed with an aqueous dispersion of tetrafluoroethylene-perfluoro-3,6-dioxa-4-methyl-7-octene-sulfonic acid copolymer, which is commercially available under the trade designation NAFION from DuPont (Wilmington, Del.). The mixture can be coated onto a substrate such as a carbon paper support that has been previously coated with a gas diffusion microlayer. This catalyst-coated, gas diffusion microlayer-coated, carbon paper can then be used as the cathode catalyst and gas diffusion layer (GDL) of a membrane electrode assembly (MEA). The remaining components used in the MEA can be a proton exchange membrane and an anode catalyst layer such as a platinum/carbon-dispersed ink coated onto a carbon-paper gas diffusion layer. The components of the MEA can be bonded together to ensure good contact. Alternatively, the catalyst ink can be coated onto a liner, using any of the dispersion coating methods described above, and subsequently transferred by way of a decal process to a PEM, to provide a catalyst coated membrane (CCM). In another aspect, the catalyst ink can be coated directly onto the PEM to form a CCM. Any suitable method of ensuring intimate contact between the GDL, the catalyst, and PEM can be used in this invention.

Examples of this aspect of the invention can be seen in the polymerization of 4-nitroaniline onto nanoparticle TiC in the presence of anhydrous Fe(II) chloride, followed by thermal treatment in $N_2/NH_3$, which produced a catalyst that exhibited outstanding durability. A sample prepared using TiC as a substrate for the deposition exhibited activity at 0.6V (as extracted from the polarization curves) that steadily increased for the first 40 hours when subjected to a constant voltage (0.65V), and then current at 0.6V (as extracted from the polarization curves which were measured at periodic intervals between the 0.65V potentiostatic hold) essentially held constant for over 900 more hours of testing. Data in the form of a graph of the current density versus time, produced using a variety of membrane electrode assemblies (MEAs) with different cathode catalysts, including a cathode catalyst according to the present invention, were examined. The sample prepared using TiC as a substrate, while not having as high an initial activity as the samples prepared using high surface area carbon, still exhibits activity that is extremely stable. For example, after approximately 70 hours of continuous testing, the sample prepared using the nanoparticle TiC as a catalyst support possessed the highest current at 0.6V of any example.

In one example, a fuel cell can produce greater than or equal to about 100 percent of the initial current of about 0.015 $A/cm^2$ at 0.6V after 100 hours of operation under saturated conditions at 75° C. with 500 sccm hydrogen flow to the anode and 500 sccm air flow to the cathode and with backpressure of 30 psig on both the anode and cathode. In another example, a fuel cell can produce greater than or equal to about 100% of the initial current of about 0.015 $A/cm^2$ at 0.6V after 800 hours of operation under saturated conditions at 75° C. with 500 sccm hydrogen flow to the anode and 500 sccm air flow to the cathode and with backpressure of 30 psig on both the anode and cathode.

In another aspect, this invention also provides for a membrane electrode assembly (MEA) and a fuel cell that comprise any of the supported fuel cell cathode catalysts according to this disclosure. For example, this disclosure affords a fuel cell cathode catalyst comprising the pyrolysis product of a mixture comprising at least one nitro-containing, amino-containing aromatic compound, at least one transition metal salt, and optionally at least one nanoparticle substrate, wherein pyrolysis occurs under a substantially inert atmosphere;
the pyrolysis product is activated by heating in the presence of a nitrogenous activating agent; and
optionally, the activated pyrolysis product is washed with a metal removing agent.

In a further aspect, the catalysts of this disclosure can be deposited as a top layer on any number of intervening film layers that are themselves deposited on the gas diffusion microlayer-coated, carbon paper, prior to the deposition of the present catalysts. These multilayered structures can then be used as the cathode catalyst and gas diffusion layer (GDL) of a membrane electrode assembly (MEA).

When the present catalysts are deposited on the intervening film layers described above, they can be deposited from a dispersion of the catalyst particles onto a backing layer or gas diffusion layer (GDL) that has been pre-coated with any number of the intervening film layers such as carbon, nitrogen, transition metals, and the like, in the same manner described above for deposition onto a backing or GDL that does not bear an intervening coating, such as dip coating, spray coating, spin coating, blade or knife coating, and the like. In one aspect, for example, the gas diffusion microlayer-coated, carbon paper can be subjected to an initial processing step or processing environment in a physical vapor deposition (PVD) system, where the PVD system includes a carbon target and a transition metal target that is typically substantially free of precious metals. The first processing environment is generated by evacuating the PVD system to a reduced pressure, and then introducing a gas until a suitable operating pressure is reached. Examples of suitable gases for the first processing environment include nitrogen-containing gases which can be employed in depositing nitrogen, hydrogen, argon, or any combination thereof. Nitrogen-containing gases that are particularly suitable include, but are not limited to: nitrogen; ammonia; nitrogen-containing volatile organic compounds such as pyridine, acetonitrile, pyrrole, pyrrolidine, or quinoline; or any combination thereof. Vacuum deposition may be carried out in any suitable apparatus, such as described in U.S. Pat. Nos. 5,338,430, 5,879,827, 5,879,828, 6,040,077, 6,319,293, and 6,482,763.

When a range is stated herein, the range is intended to include every possible number in the range including the endpoints of the range. For example, the disclosure that a molar ratio of component A to component B can span a range of from about 0.5 to about 1.5 means that the molar ratio of component A to component B can be selected from about 0.5, about 0.6, about 0.7, about 0.8, about 0.9, about 1.0, about 1.1, about 1.2, about 1.3, about 1.4, or about 1.5.

For any particular compound disclosed herein, any general structure or any general name of the compound presented encompasses all conformational isomers, regioisomers, and stereoisomers that can arise from a particular set of substituents. Thus, the general structure also encompasses all enantiomers, diastereomers, and other optical isomers whether in enantiomeric or racemic forms, as well as mixtures of stereoisomers, as the context requires.

Although methods, syntheses, and materials similar or equivalent to those described herein can be used in the practice or testing of this invention, typical methods, syntheses, and materials are described herein.

To more clearly define the terms used herein, the following definitions are provided. To the extent that any definition or usage provided by any document incorporated herein by reference conflicts with the definition or usage provided herein, the definition or usage provided herein controls.

A "nanoscopic particle" or "nanoparticle" generally is used to mean a particle of a material having at least one dimension equal to or smaller than about 150 nm or having a crystallite size of about 150 nm or less, as measured from diffraction peak half widths of standard $2\theta$ X-ray diffraction scans. In another aspect, the nanoparticles can have at least one dimension equal to or smaller than about 100 nm, about 50 nm, or about 25 nm, or have a crystallite size of about 100 nm or less, about 50 nm or less, or about 25 nm or less, as measured from diffraction peak half widths of standard $2\theta$ X-ray diffraction scans. The recitation of these sizes is not intended to be applied to the sizes of any aggregates, clusters, agglomerates, or combinations of particles of this type, which may have formed or amassed under the conditions disclosed herein. Such sizes easily can encroach well into the micrometer or micron-sized range (greater than about 1000 nm), thus terms such as nanoscopic or nanoparticle are non-limiting with respect to clusters or aggregates of the particles.

In a further aspect of this invention, and while not intending to be bound by theory, it appears that the use of agglomerates or clusters of the very small nanoparticles disclosed herein can provide some practical benefit. For example, when very small nanoparticles are sufficiently crystalline as to have low impedance, nanoparticles in the form of aggregates or clusters typically provide a conductive pathway for the electrons to move to the electrode in a facile manner. Moreover, nanoparticles in the form of aggregates are typically easier to handle and manipulate than nanoparticles which are not agglomerated.

A "non-precious metal" means a metal other than ruthenium, osmium, rhodium, iridium, palladium, platinum, gold, or silver.

A "salt" is non-limiting and intends to encompass any metal compound of the relevant oxidation state, regardless of whether the compound exists as a salt form in the solid state or in solution, including coordination compounds that may or may not exist as salts.

The terms "HNC" and associated terms such as "highly nitrogenated carbon material," and the like, are intended to describe the material produced according to the present invention and/or the catalysts according to the present invention, in any form, such as supported or unsupported or metal-containing or not, without limitation, regardless of any particular structure of the catalytic material, and regardless of whether or not any discrete structure of the material produced according to the present invention can be determined.

The following abbreviations may be used in the examples and throughout this disclosure:

h, hours;
min, minutes;
° C., degrees Centigrade;
° F., degrees Fahrenheit;
mL, milliliter;
L, liter;
cm, centimeter;
in, inches;
V, volts;
mV, millivolts;
A, amps;
mA, milliamps;
kW, kilowatts;
s, seconds;
g, grams;
mg, milligrams;
μm, micrometers;
kg, kilograms;
lb, pounds;
psig, pounds per square inch gauge;
mtorr, millitorr;
lpm, liters per minute;
cfm, cubic feer per minute;
HEPA, high efficiency particulate air [filter];
RT, room temperature;
SCCM, standard cubic centimeters per minute, also standard $cm^3/min$;
CCB, catalyst-coated backing;

GDL, gas diffusion layer;
MEA, membrane electrode assembly;
FC, fuel cell;
PEM, proton exchange membrane or polymer electrolyte membrane;
redox, reduction-oxidation or oxidation-reduction;
BPP, bipolar plates;
CCM, catalyst coated membrane;
FTL, fluid transport layer; and
DCC, diffuser/current collector.

In addition, the following abbreviations may be used in the examples and throughout the disclosure, as described in detail below: G, grinding of reagents; DM, dry milling; WM, wet milling; TIR, thermally-induced reaction; BW, base washing; AW, acid washing; F1, first firing; F2, second firing; and S, sonication.

General references related to fuel cell technology include the following: 1) M. K. Debe, "Novel catalysts, catalyst support and catalyst coated membrane methods," in *Handbook of Fuel Cells, Fundamentals, Technology and Applications*, Vol. 3, eds. W. Vielstich, A. Lamm and H. Gasteiger, John Wiley and Sons, p. 576 et seq.; 2) Markovic et al., *Oxygen Reduction Reaction on Pt and Pt Bimetallic Surfaces: A Selective Review*, Fuel Cells, 2001, vol. 1, No. 2 (pp. 105-116); 3) Paulus et al., *Oxygen Reduction on Carbon-Supported Pt-Ni and Pt-Co Alloy Catalysts*, J. Phys. Chem. B, 2002, No. 106 (pp. 4181-4191); and 4) M. Lefevre, J. P. Dodelet, *J. Phys. Chem. B*, 104 (2000) 11238 and F. Jaouen, S. Marcotte, J. P. Dodelet, G. Lindbergh, *J. Phys. Chem. B*, 107 (2003) 1376.

Patents, published patent applications, and patent applications related to fuel cell catalysts include the following: 1) U.S. Pat. Nos. 4,812,352; 5,039,561; 5,176,786; and 5,336,558, which concern microstructures; 2) U.S. Patent Application Publication Number US 2005/0069755, describes fuel cell cathode catalysts comprising nanostructures; 3) U.S. Pat. Nos. 5,079,107; 4,985,386; 5,593,934; 5,872,074, describes fuel cell catalysts; and 4) U.S. patent application Ser. No. 11/248,441, filed Oct. 12, 2005, describes certain nanostructured thin film catalysts.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

EXAMPLES

Unless specified otherwise, general procedures used in preparing, characterizing, and using the materials and components of this invention are as follows.

The following reagents were obtained from the specified sources: 4-nitroaniline, anhydrous cobalt chloride, anhydrous ferrous chloride, 4-(4-nitrophenylazo)catechol, and 2-nitroaniline (Alfa Aesar, Ware Hill, Mass.); C55 carbon (Shawinigan Black, Grade C55, Chevron Phillips Chemical Co., LP, Baytown, Tex.); haematoporphyrin dihydrogen chloride (Avocado Research Chemicals, Ltd., Lancaster, United Kingdom); nanoparticle TiC (Nanomaterials Research Corporation, Longmont, Colo.); anhydrous ferric chloride (Merck KGaA, Darmstadt, Germany); and TiN (Grade C; H. C. Starck, Inc., Newton, Mass.). Other reagents used are available from Aldrich Chemical Co., Milwaukee, Wis., or they may be synthesized by known methods.

The following reagents were prepared as described.

$TiSi_{1.95}$. The highly conductive intermetallic alloy $TiSi_{1.95}$ (atomic composition) was made by the thermal alloying process, as follows. Lunps of Si (34.687 g, 99.9999% (metal basis), Alfa Aesar, Ward Hill, Mass.) and Ti sponge (115.313 g, Alfa Aesar) were alloyed by melting together in an ARC Furnace under an Argon/$H_2$ atmosphere. The alloy ingot was then crushed into coarse powder and ball milled further to the desired particle size. A particle size of about 20 microns or less was obtained by sieving the crushed material though a 20-micron mesh.

$Ti_{30}Si_{70}$. A homogeneous solid particle mixture of Si and Ti was formed in the atomic ratio of 70:30 (Si:Ti) by vigorously shaking 577.89 g of the Si powder (99%, 325 mesh; Sigma-Aldrich Corporation, Milwaukee, Wis.) and 422.11 g of Ti powder (99.5%, 325 mesh, Cerac Specialty Metals, Milwaukee, Wis.) in a glass bottle. This mix of powder was aerosolized with 20 lpm of Ar and axially fed into an Ar/$H_2$/He thermal plasma generated by a PL-35 RF torch from Tekna Plasma Systems (Quebec, Canada). The vapors of evaporated Si/Ti metal were than quenched with 10 cfm of Argon flow injected radially. Powder feed rates were between 2 and 5 g/min and a plate power of 50 kW was applied to form the particles. The particles were processed in a cyclone and then collected at a reverse jet filter (HEPA). Collected nanoparticles were than slowly exposed to air (200 mtorr, 30 minutes) to allow the surface to gently oxidize.

Preparation of Catalysts Using Individual Processing Steps

Referring to Table 1, the catalyst materials listed in the table were prepared by a series of individual preparative or processing steps, each of which is detailed below along with the corresponding abbreviation used to designate that step. Processing steps were carried out in the order listed in Table 1. The details for the firing of each example listed in Table 1 are also provided below.

Grinding of reagents (G). Combinations or mixtures of the listed precursors were intimately and thoroughly mixed to provide a mixture that appeared relatively homogeneous, and then ground using a tungsten carbide mortar and pestle until the mixtures were very uniform in appearance and color.

Dry milling (DM). After pre-mixing by grinding, the samples were then milled using a SPEX model 2000 shaker mill, using tungsten carbide end-facings and a tungsten carbide ball (Spex CertiPrep Inc., Metuchen, N.J.).

Thermally-Induced Reaction (TIR). After combining and homogenizing the reagents by grinding, dry milling, or both, the mixture of reagents was charged to a beaker, along with a Teflon stir bar, and the beaker was fitted with a loose-fitting aluminum cover having a hole in the center to allow an introduction of nitrogen gas during the thermal treatment. After thoroughly flushing the beaker with nitrogen gas, the beaker was heated on a hot plate while maintaining a gentle flow of nitrogen. Above about 150° C. to about 200° C., the mixture darkened and liquefied and the mixture was slowly stirred using the stir bar. Between about 275° C. and about 300° C. the liquefied mixture began to smoke and the mixture swelled and expanded, and solidified with a sharp release of gas. Additional heat was supplied by heating the exterior of the beaker with a heat gun (Model 2Z045, Dayton Heat Gun, Dayton Electric Manufacturing, Chicago, Ill.) until the evolution of gas had ceased. The resulting material was cooled under a flow of nitrogen and subsequently was removed by scraping with a spatula.

Base washing (BW). The thermally-induced reaction mixture was washed by sedimentation/decantation with a solution prepared by diluting 25 mL of concentrated ammonium hydroxide to 500 mL with deionized water.

Firing (Fnumber). Firing was carried out in a tube furnace through which the treatment gases were passed. The firing gas treatment schedule(s) is described below for each sample. In examples with more than one firing step, F1 is the first firing step, F2 is the second firing step, and F3 is the third firing step.

Wet milling (WM). The samples were combined with 1700 g of 0.25 inch zirconia mill media (radius-end cylinders, Zircoa Incorporated, Solon, Ohio) and 570 g of deionized water in a 1-quart polyethylene jar and the mixture was vibromilled for about 24 hours using a Sweco grinding mill (Model K18/5, Sweco, Florence, Ky.). The material was separated by settling/decantation.

Acid washing (AW). Acid washing was performed by immersing the sample for 24 hours in about 300 g of a sulfuric acid solution, prepared by diluting 100 g of concentrated sulfuric acid in 800 g of deionized water. The sample was separated from the acid by decantation and then washed with 2 liters of deionized water by settling/decantation. The sample was dried at about 130° C. for 12 hours.

Sonication (S). A stirred sample of 2.15 g of the material in 100 g of deionized water was treated with ultrasonic energy for about 10 minutes (generated using a Sonic Materials Inc, Model VX750 ultrasonic generator). The ultrasonically-treated material was then dried at 130° C. in an oven.

TABLE 1

Examples of Catalysts and Process Steps for their Preparation.

| Example No. | Precursor Reagents | Sequential Process Steps |
|---|---|---|
| 1 | 8.10 g anhydrous $FeCl_3$<br>5.4 g 2-nitroaniline<br>3.68 g C55 carbon | G, TIR, G, BW, WM, F, AW |
| 2 | 8.23 g anhydrous $FeCl_3$<br>5.39 g 4-nitroaniline<br>3.50 g C55 carbon | G, TIR, G, BW, WM, F, AW |
| 3 | 8.91 g anhydrous $FeCl_3$<br>3.02 g 2-nitroaniline<br>3.05 g 4-nitroaniline<br>4.10 g C55 carbon | G, TIR, G, BW, WM, F, AW |
| 4 | 4.46 g anhydrous $FeCl_2$<br>16.58 g 4-nitroaniline<br>3.0 g C55 carbon | G, TIR, G, F1, WM, F2, AW |
| 5 | 4.46 g anhydrous $FeCl_2$<br>16.58 g 4-nitroaniline<br>3.0 g C55 carbon | G, TIR, G, F1, WM, F2, AW, S |
| 6 | 4.46 g anhydrous $FeCl_2$<br>16.58 g 4-nitroaniline<br>0.5 g 4-(4-nitrophenylazo)catechol | G, TIR, G, F1, WM, F2, AW, S |
| 7 | 4.46 g anhydrous $FeCl_2$<br>18.02 g 4-nitroaniline<br>3.0 g nanoparticle TiC | G, TIR, G, F1, G, F2, WM, AW, S |
| 8 | 1.5 g anhydrous $FeCl_2$<br>1.4 g 4-nitroaniline<br>1.5 g haematoporphyrin dihydrogen chloride | G, DM, TIR, G, F1, DM, F2, AW, S |
| 9 | 8.53 g anhydrous cobalt chloride<br>5.25 g 4-nitroaniline<br>2.57 g C55 carbon | G, TIR, G, BW, WM, F, AW |
| 10 | 3.43 g anhydrous ferrous chloride<br>22.47 g 4-nitrophthalimide<br>3.00 g C55 carbon | G, TIR, G, F1, WM, F2, WM, F3, AW, S |
| 11 | 4.46 g anhydrous ferrous chloride<br>18.02 g 4-nitroaniline<br>5.0 g $TiSi_{1.95}$ | G, TIR, G, F1, WM, F2, AW, S |
| 12 | 4.46 g anhydrous ferrous chloride<br>18.02 g 4-nitroaniline<br>4.46 g $Ti_{30}Si_{70}$ | G, TIR, G, F1, WM, F2, AW, S |
| 13 | 4.46 g anhydrous ferrous chloride<br>18.02 g 4-nitroaniline<br>15.77 g TiN | G, TIR, G, F1, WM, F2, AW, S |
| Comparative Example 1 | 6.0 g TiC | WM, G, F, S |

Firing Schedules and Additional Preparative Details

Example 1

The catalyst material of Example 1 was prepared according to Table 1. This material was then subjected to the following firing schedule: purge with nitrogen for 1 hour; heat at 3.2° C./min to 400° C. under nitrogen; hold at 400° C. for 2 hours under a flow of 80% $N_2$/20% $H_2$; heat at 1.67° C./min to 900° C. under a flow of 75% $N_2$/25% $NH_3$ and hold at 900° C. for 2 hours in 75% $N_2$/25% $NH_3$; cool before removing from furnace.

After acid washing, washing with deionized water and drying, the sample was found by X-ray fluorescence spectroscopy to contain about 4.4 weight percent nitrogen and 93.3 weight percent carbon.

Example 2

The catalyst material of Example 2 was prepared as indicated in Table 1. This material was then fired according to the same firing schedule used in Example 1.

Example 3

The catalyst material of Example 3 was prepared as indicated in Table 1. This material was then fired according to the same firing schedule used in Example 1.

After acid washing, washing with deionized water and drying, the sample was found by X-ray fluorescence spectroscopy to contain about 9.9 weight percent nitrogen and 87.6 weight percent carbon. The HNC acidity value is expected to be less than 3.

Example 4

The catalyst material of Example 4 was prepared as indicated in Table 1. This material was then calcined to 800° C. according to the following schedule: heat from room temperature to 400° C. at 6° C./minute under a flow of nitrogen; hold at 400° C. for 1 hour under a flow of 80% $N_2$/20% $H_2$; heat to 500° C. at 8° C./minute and hold at 500° C. for 1 hour under a flow of 75% $N_2$/25% $NH_3$; heat to 800° C. at 8° C. per minute and hold at 800° C. for 1 hour under a flow of 75% $N_2$/25% $NH_3$; cool before removing from furnace.

After acid washing, washing with deionized water and drying, the sample was found by X-ray fluorescence spectroscopy to contain about 10.3 weight percent nitrogen and 88.1 weight percent carbon. The HNC acidity value is expected to be less than 3.

Example 5

The catalyst material of Example 5 was prepared as indicated in Table 1. The first firing was in accordance with the same firing schedule used in Example 4. The second firing was according to the following schedule: heat from room temperature to 400° C. at 6° C./min under a flow of nitrogen; hold at 400° C. for 2 hours under a flow of nitrogen; heat from 400° C. to 950° C. in 2 hours under a flow of 50% $N_2$/25% $NH_3$ along with 25% $N_2$ that was bubbled through a flask of acetonitrile that was maintained at about 40° C.; hold at 950° C. for 1 hour under this gas flow; cool before removing from furnace.

The HNC acidity value is expected to be less than 2.75.

Example 6

The catalyst material of Example 6 was prepared as indicated in Table 1. This material was then fired according to the same firing schedule used in Example 5.

The HNC acidity value is expected to be less than 2.5.

Example 7

The catalyst material of Example 7 was prepared as indicated in Table 1. The first firing was according to the following schedule: heat from room temperature to 400° C. under a flow of nitrogen at 6° C./min; hold at 400° C. for 2 hours under a flow of nitrogen; heat to 600° C. at 8° C./min under a flow of nitrogen; hold at 600° C. for 1 hour under a nitrogen flow; allow to cool. The second firing was according to the following schedule: heat from room temperature to 400° C. under a flow of nitrogen at 6° C./min; hold at 400° C. for 2 hours under a nitrogen flow; heat to 950° at 8° C./min in a flow of 75% $N_2$/25% $NH_3$; hold at 950° C. for 1 hour under a flow of 75% $N_2$/25% $NH_3$; cool before removing from furnace.

Example 8

The catalyst material of Example 8 was prepared as indicated in Table 1. The first firing was according to the following schedule: heat from room temperature to 600° C. in a nitrogen flow at 6° C./min, hold at 600° C. for 1 hour under a nitrogen flow; allow to cool. The second firing was in accordance with the same firing schedule as the second firing used in Example 7.

The HNC acidity value is expected to be less than 2.75.

Example 9

The catalyst material of Example 9 was prepared as indicated in Table 1. The firing was according to the following schedule: heat from room temperature to 400° C. at 6° C./min in a flow of nitrogen; hold at 400° C. for 2 hours under a mixture of 80% $N_2$/20% $H_2$; ramp the temperature at 8° C./min to 850° C. under a flow of 75% $N_2$/25% $NH_3$; and hold at 850° C. for 1 hour under a flow of 75% $N_2$/25% $NH_3$.

Example 10

The catalyst material of Example 10 was prepared as indicated in Table 1. The second wet milling step was carried out for 84 hours rather than 24 hours as used for the first wet milling step. The first firing was according to the following schedule: heat from room temperature to 600° C. under nitrogen at 6° C./min; hold at 600° C. for 1 hour; then cool. The second and third firings were according to the following schedule: heat from room temperature to 400° C. at 6° C./min under nitrogen; hold at 400° C. for 2 hours in a mixture of 80% $N_2$/20% $H_2$; ramp the temperature at 8° C./min to 900° C. under a flow of 75% $N_2$/25% $NH_3$; hold at 900° C. for 1 hour in $N_2$; cool under a nitrogen atmosphere.

Example 11

The catalyst material of Example 11 was prepared as indicated in Table 1. The first firing was according to the following schedule: heat from room temperature to 600° C. in nitrogen at 6° C./min; hold at 600° C. for 1 hour under nitrogen; allow to cool. The second firing was according to the following schedule: heat from room temperature to 400° C. at 6° C./min under nitrogen; hold at 400° C. for 2 hours in a mixture of 80% $N_2$/20% $H_2$; ramp the temperature at 8° C./min to 950° C. under a flow of 75% $N_2$/25% $NH_3$; hold at 950° C. for 1 hour under the flow of $N_2$/$NH_3$; allow to cool under the flow of $N_2$/$NH_3$.

Example 12

The catalyst material of Example 12 was prepared as indicated in Table 1. The first firing was according to the following schedule: heat from room temperature to 600° C. in nitrogen at 6° C./min; hold at 600° C. for 1 hour; allow to cool. The second firing was according to the following schedule: heat from room temperature to 400° C. at 6° C./min under nitrogen; hold at 400° C. for 2 hours in a mixture of 80% $N_2$/20% $H_2$; ramp the temperature at 8° C./min to 950° C. under a flow of 75% $N_2$/25% $NH_3$; hold at 950° C. for 1 hour in the $N_2$/$NH_3$ flow; cool in the $N_2$/$NH_3$ flow.

Example 13

The catalyst material of Example 13 was prepared as indicated in Table 1 and was fired according to the procedure described in Example 12.

Comparative Example 1

The catalyst material of Comparative Example 1 was prepared as indicated in Table 1 and was fired according to the following schedule: heat from room temperature to 400° C. under nitrogen at 6° C./min, hold at 400° C. for 2 hours under nitrogen; heat to 950° at 8° C./min in a flow of 75% $N_2$/25% $NH_3$; hold at 950° C. for 1 hour in the flow of $N_2$/$NH_3$; allow to cool in the $N_2$/$NH_3$ flow.

Preparation of the Membrane Electrode Assemblies (MEAs) Using the Catalyst Materials of Table 1

A dispersion of the catalyst particles processed according to Table 1 was prepared by mixing a 10-13% (by weight) aqueous NAFION dispersion, the catalyst particles, and deionized (DI) water. For Examples 1-7, the weight ratio of these ingredients was about 10 (aqueous NAFION dispersion) to about 1.5 (catalyst particles) to about 10 (DI water), respectively. For Examples 8-11, the weight ratio of these ingredients was about 8 (aqueous NAFION dispersion) to about 2 (catalyst particles) to about 8 (DI water), respectively. The mixture was then heated to about 100° C. on a hot plate for about 30 minutes and subsequently allowed to cool, and after cooling the sample was stirred. A coating of about 85 to about 98 milligrams (dry weight) of the catalyst ink dispersion was hand-brushed onto an approximately 50-cm² size sample of a GDL [carbon paper support (commercially available under the trade name AVCARB P50 Carbon Fiber Paper, from Ballard Material Products, Lowell, Mass.), which was previously treated for hydrophobicity and coated with a gas diffusion microlayer]. The coated sample was dried at about 110° C. under vacuum (at about 25 in Hg) for approximately 20 minutes. This catalyst-coated backing (CCB) was used as the cathode catalyst and gas diffusion layer (GDL) of a membrane electrode assembly (MEA).

The anode catalyst layer included a platinum/carbon-dispersed ink coated on a carbon-paper gas diffusion layer. This carbon-paper gas diffusion layer was fabricated by coating a gas diffusion micro-layer on one side of a carbon fiber paper (commercially available under the trade name AVCARB™ P50 Carbon Fiber Paper, from Ballard Material Products, Lowell, Mass.), that had been treated for hydrophobicity. The anode catalyst platinum loading ranged from about 0.3 mg Pt/cm² to about 0.4 mg Pt/cm². Gaskets were selected for about 25% to about 30% compression on both the anode and the cathode. Using a static press, the anode and cathode catalysts were bonded to a pair of cast Nafion® membranes (each approximately 30 micrometers thick, 1000 EW) at 132° C.-138° C. (270° F.-280° F.) and 1,361-1,814 kilograms (3,000-4,000 pounds) for 10 minutes. The resulting MEA was placed into a standard 50-cm² fuel cell test fixture with quad serpentine flow fields (from Fuel Cell Technologies).

Catalyst Activity Tests

The catalytic activity of each of the MEAs prepared using the new catalytic materials was measured using the following procedures. These measurements involved recording the polarization curves, under oxygen, using a potentiostat (commercially available under the trade name SOLARTRON CELLTEST 1470 from Solartron Analytical, Oak Ridge, Tenn.) and a software package (commercially available under the trade designation CORWARE™ from Scribner Associates, Inc., Southern Pines, N.C.). Cyclic voltammograms were recorded 50, 20, 10 and 5 millivolts/second scan rates. In order to compare the catalytic activity, the comparisons were made at the same voltage using a scan rate of 5 millivolts/second.

Catalytic activity under oxygen was measured under two different conditions, as follows.

Condition (i). Hydrogen and oxygen streams were introduced to the anode and cathode sides of the fuel cells, respectively, at flow rates of about 500 standard cm³/min (SCCM) each. Electrochemical measurements were taken at 75° C. with approximately 132% relative humidity at ambient pressure (0 psig) on both anode and cathode.

Condition (ii). Hydrogen and oxygen streams were introduced to the anode and cathode sides of the fuel cells, respectively, at flow rates of about 180 standard cm³/min (SCCM) and 335 SCCM, respectively. The anode backpressure was approximately 30 psig and the cathode backpressure was approximately 50 psig. Electrochemical measurements were taken at 80° C. with approximately 100% relative humidity.

Table 2 summarizes the measured voltages at 4 mA/cm² and 80 mA/cm² for each of the catalyst materials of Examples 1 through 13, under the two different test conditions described above as Condition (i) and Condition (ii). The reported voltages from Table 2 were obtained from cyclic voltammograms performed at 5 mV/s scan rate, and demonstrate the oxygen reduction activity of the catalysts of this invention.

Durability Tests Using TiC as a Catalyst Substrate

Table 3 presents data that compares the current density (A/cm²) at about 0.6 V recorded from the polarization curves, which were obtained using the following durability test protocol. Durability testing was conducted by setting the cell at a fixed voltage (0.6V-0.65V) for five hours. Before and after each five hour potentiostatic hold, two cyclic voltammograms at 5 mV/s (also referred to as polarization curves) were performed. During the testing, hydrogen and air gas streams were introduced to the anode and cathode sides of the cell each at a flow rate of 500 SCCM. The anode and cathode backpressures were both about 30 psig. Electrochemical measurements were taken at 75° C. with approximately 100% relative humidity.

TABLE 3

Extended Testing of Catalyst Activity.

| | Current at about 0.6 V(A/cm²) § | | | |
|---|---|---|---|---|
| Example | Initial | After 50 Hours | After 100 Hours | After 800 Hours |
| 5 | 0.0837 | 0.0216 | 0.0118 | — |
| 7 | 0.0155 | 0.0183 | 0.0175 | 0.0177 |

§ Extracted from polarization curve.

As illustrated by performance of the nanoparticle TiC-supported catalyst of Example 7 (Table 3), a fuel cell comprising the catalyst material of Example 7 was capable of producing greater than or equal to about 100% of the initial current of about 0.015 A/cm² at 0.6V after 50 h of operation, greater than or equal to about 100% of the initial current of about 0.015 A/cm² at 0.6V after 100 h of operation, or even greater than or equal to about 100% of the initial current of about 0.015 A/cm² at 0.6V after 800 h of operation. Thus, after 50 h about 118% of the initial current of 0.0155 A/cm² at 0.6V was produced, after 100 h about 113% of the initial current of 0.0155 A/cm² at 0.6V was produced, and after 800 h about 114% of the initial current of 0.0155 A/cm² at 0.6V was produced. This performance can be compared to performance of the carbon-supported catalyst of Example 5 data in Table 3, which revealed declining performance over this same time period. For the Example 5 catalyst, after 50 h about 26% of the initial current of 0.0837 A/cm² at 0.6V was produced, and after 100 h about 14% of the initial current of 0.0837

TABLE 2

Catalyst Activity Under Oxygen.

| Example | Cell Voltage at 80 mA/cm² (V) Condition (i) | Cell Voltage at 80 mA/cm² (V) Condition (ii) | Cell Voltage at 4 mA/cm² (V) Condition (i) | Cell Voltage at 4 mA/cm² (V) Condition (ii) |
|---|---|---|---|---|
| 1 | 0.35 | 0.50 | 0.62 | 0.71 |
| 2 | 0.49 | 0.60 | 0.68 | 0.77 |
| 3 | 0.47 | 0.57 | 0.71 | 0.74 |
| 4 | 0.52 | 0.64 | 0.73 | 0.78 |
| 5 | 0.62 | 0.71 | 0.77 | 0.83 |
| 6 | 0.63 | 0.71 | 0.79 | 0.86 |
| 7 | 0.42 | 0.59 | 0.70 | 0.78 |
| 8 | 0.61 | 0.40 | 0.77 | 0.82 |
| 9 | 0.28 | 0.40 | 0.47 | 0.58 |
| 10 | 0.47 | 0.63 | 0.73 | 0.79 |
| 11 | 0.30 | 0.51 | 0.65 | 0.73 |
| 12 | 0.53 | 0.64 | 0.74 | 0.78 |
| 13 | 0.02 | 0.42 | 0.67 | 0.69 |
| Comparative Example 1 | NA | 0.13 | 0.33 | 0.50 |

A/cm² at 0.6V was produced. Due to the high decay rate, testing was aborted before 800 hours.

We claim:

1. A method of making a highly-nitrogenated carbon fuel cell cathode catalyst comprising:
   a) polymerizing a mixture comprising at least one nitro-containing, amino-containing aromatic compound and at least one transition metal salt to form a metal-containing polymer; and
   b) thermally activating the metal-containing polymer by heating the metal-containing polymer in the presence of a nitrogenous activating agent to form a highly-nitrogenated carbon fuel cell cathode catalyst that contains metal,
   wherein the mixture further comprises at least one nanoparticle substrate and wherein the fuel cell cathode catalyst is a supported fuel cell cathode catalyst;
   wherein the nitrogenous activating agent is selected from the group consisting of ammonia, nitrogen, acetonitrile, pyridine, hydrogen cyanide, cyanogen, pyrrole, pyrrolidine, quinoline, tetrahydroquinoline, piperidine, and combinations thereof; and
   wherein the at least one nitro-containing, amino-containing aromatic compound is selected from the group consisting of:
   2-nitroaniline,
   3-nitroaniline,
   4-nitroaniline,
   2-methyl-3-nitroaniline,
   2-methyl-4-nitroaniline,
   2-methyl-5-nitroaniline,
   2-methyl-6-nitroaniline,
   4-methyl-2-nitroaniline,
   4-ethyl-2-nitroaniline,
   2-chloro-4-nitroaniline,
   2-methyl-4-nitroaniline,
   2-amino-4-nitrophenol,
   3-methyl-4-nitrophenol,
   2-amino-4-nitrotoluene,
   2-amino-4-chloro-5-nitrotoluene,
   2, 6-dichloro-4-nitroaniline,
   2, 6-dibromo-4-nitroaniline,
   4, 5-dichloro-2-nitroaniline,
   4-(benzyloxy)- 5-bromo-2-nitroaniline,
   4-(tert-butyl)- 3-nitroaniline,
   4-benzyloxy-2-nitroaniline,
   5-bromo-4-methyl-2-nitroaniline
   5-chloro-2-methoxy-4-nitroaniline,
   5-ethoxy-4-fluoro-2-nitroaniline,
   5-nitro-5-naphthylamine,
   2-amino-7-nitrofluorene,
   4-nitrophthalimide,
   2-amino-5-nitropyridine, and combinations thereof.

2. The method of making a fuel cell cathode catalyst according to claim 1, wherein said polymerizing comprises heating the mixture in an atmosphere that has been inerted.

3. The method of making a fuel cell cathode catalyst according to claim 1, further comprising step c):
   c) washing the highly-nitrogenated carbon fuel cell cathode catalyst with a metal removing agent to form a washed fuel cell cathode catalyst containing less transition metal than the highly-nitrogenated carbon fuel cell cathode catalyst.

4. The method of making a fuel cell cathode catalyst according to claim 3, wherein the washed fuel cell cathode catalyst contains only trace amounts of transition metal.

5. The method of making a fuel cell cathode catalyst according to claim 1 wherein the at least one nitro-containing, amino-containing aromatic compound and the at least one transition metal salt are mixed so as to induce or finish polymerization of the mixture.

6. The method of making a fuel cell cathode catalyst according to claim 1 wherein the thermally activating step is carried out under anhydrous conditions.

7. The method of making a fuel cell cathode catalyst according to claim 1 wherein the at least one transition metal salt is selected from an anhydrous salt of Fe(II), Fe(III), Co(II), Cr(II), Cr(III), Mn(II), Ni(II), Cu(II), or any combination thereof.

8. The method of making a fuel cell cathode catalyst according to claim 1 wherein the at least one transition metal salt is selected from a metal chloride, a metal bromide, a metal iodide, a metal fluoride, a metal acetate, a metal nitrate, a metal nitrite, a metal carbonate, a metal cyanide, a metal hydroxide, a metal phosphate, a metal phosphite, a metal sulfite, a metal sulfate, or any combination thereof.

9. The method of making a fuel cell cathode catalyst according to claim 1 wherein the weight ratio of the at least one transition metal salt to the at least one nitro-containing, amino-containing aromatic compound in the mixture is from about 10:1 to about 1:10.

10. The method of making a fuel cell cathode catalyst according to claim 1 wherein the mixture further comprises at least one auxiliary nitrogen-containing compound selected from porphyrins, nitrophenylazo compounds, phenanthrolines, piperazines, pyrroles, imidazoles, and metal complexes of these compounds.

11. The method of making a fuel cell cathode catalyst according to claim 1 wherein the mixture further comprises at least one auxiliary nitrogen-containing compound selected from haematoporphyrin dihydrogen chloride, porphyrin, protoporphyrin, 5,10,15,20-tetra(4-pyridyl)porphyrin, 5,10,15,20-tetrakis(1-methyl-4-pyridinio)porphyrin tetra(p-toluenesulfonate), 5,10,15,20-tetrakis(4-trimethylammoniophenyl) porphyrin tetra(p-toluenesulfonate), meso-tetra(N-methyl-4-pyridyl)porphyrin iron, 4-(4-nitrophenylazo)catechol, 4-(4-nitrophenylazo)-1-naphthol, 4-(4-nitrophenylazo)resorcinol, 5-nitro-1,10-phenanthroline, diaminomaleonitrile and its derivatives, 1-(4-nitrophenyl)-1H-imidazole, 1-(4-nitrophenyl)-1H-pyrrole, 1-(4-nitrophenyl)-3-pyrrolidino-2-pyrazolin-5-one, 1-(4-nitrophenyl)glycerol, 1-(4-nitrophenyl)piperazine, any transition metal complex thereof, or any combination thereof.

12. The method of making a fuel cell cathode catalyst according to claim 1 wherein the polymerizing step occurs in the substantial absence of a protic acid.

13. The method of making a fuel cell cathode catalyst according to claim 1, wherein the weight ratio of the at least one transition metal salt to the at least one nanoparticle substrate in the mixture is from about 10:1 to about 1:10.

14. The method of making a fuel cell cathode catalyst according to claim 1 wherein material comprising the at least one nanoparticle substrate is selected from:
   a) carbon; or
   b) a binary or a ternary carbide, nitride, or silicide of Ti, Zr, Hf, V, Nb, Ta, Cr, Mo, W, Mn, Re, Fe, Ru, Co, Ni, Cu, B, or Si, or any combination thereof; or
   c) any combination of a) and b).

15. The method of making a fuel cell cathode catalyst according to claim 1 wherein the at least one nanoparticle substrate is selected from a carbide, a silicide, or a nitride of Ti, Ta, or W, or any combination thereof.

* * * * *